United States Patent [19]

Riederer et al.

[11] Patent Number: 4,472,829

[45] Date of Patent: Sep. 18, 1984

[54] RADIOGRAPHIC PHANTOM WITH IODINATED CHANNELS

[75] Inventors: Stephen J. Riederer, Wauwatosa; Edmund R. Steinike, New Berlin, both of Wis.; Frank A. DiBianca, Chapel Hill, N.C.

[73] Assignee: General Electric Company, Milwaukee, Wis.

[21] Appl. No.: 359,237

[22] Filed: Mar. 18, 1982

[51] Int. Cl.$^3$ .......... G02B 5/00

[52] U.S. Cl. .......... 378/207; 252/478; 424/4

[58] Field of Search .......... 378/207, 18, 147, 145, 378/165, 156, 157, 158, 159; 252/478; 350/96.1; 424/4, 5

[56] References Cited

U.S. PATENT DOCUMENTS

| | | | |
|---|---|---|---|
| 2,403,794 | 7/1946 | Goldrick et al. | 252/478 |
| 2,439,374 | 4/1948 | Leader et al. | 378/165 |
| 2,890,244 | 6/1959 | Storbeck | 424/5 |
| 3,660,664 | 5/1972 | Pasmeg | 378/156 |
| 3,749,134 | 7/1973 | Slingluff et al. | 424/5 |
| 4,126,789 | 11/1978 | Vogl et al. | 378/207 |

OTHER PUBLICATIONS

*Phantoms for Cameras and Scanners,* Atomic Development Corp., Plainview, NY, 1/1976, 4 pp.

Authors: S. J. Riederer, R. A. Kruger, and C. A. Mistretta Title: "Limitations to Iodine Isolation Using a Dual Beam Non-K-Edge Approach" Med. Phys. 8(1), Jan./Feb. 1981; pp. 54-61.

*Primary Examiner*—Alfred E. Smith
*Assistant Examiner*—T. N. Grigsby
*Attorney, Agent, or Firm*—Dana F. Bigelow; Douglas E. Stoner

[57] ABSTRACT

A radiographic phantom is comprised of only two materials, a non-iodinated material composing the base and an iodinated material disposed in a channel simulating a blood vessel, thus providing for a resultant signal attributable only to the iodinated material when a radiographic subtraction process is conducted to test an apparatus for contrast sensitivity. The phantom is fabricated by forming the base of a plastic material, forming a channel in the base, and then filling in the channel with the same kind of plastic material but with minute amounts of iodine suspended uniformly therein.

19 Claims, 7 Drawing Figures

RADIOGRAPHIC PHANTOM WITH IODINATED CHANNELS

This invention relates generally to test devices for radiographic equipment and, more particularly, to phantoms for measuring the contrast sensitivity of a digital radiography diagnostic system. One of the fast emerging fields of diagnostic medical imaging is that of digital radiography wherein x-ray signals are detected electronically, converted to digital form, and then selectively processed so as to obtain images of much greater clarity and use. These enhanced images are obtained by subtraction techniques which remove from the image those structures which are not of interest. In particular, digital radiography is particularly suited for use with vascular procedures where it is desired to have unobstructed images of the blood vessels by removing the surrounding tissue and bone from the images.

The common subtraction techniques include temporal or masked modes of subtraction, and energy or spectral subtraction, or a combination of the two.

Temporal subtraction is accomplished by acquiring at least two images, one before and one after intravenous injection of an iodinated contrast medium, and then subtracting the two by way of a digital processor. In energy subtraction, images are acquired using two different x-ray spectra which are selectively chosen such that when the two images are subtracted, the presence of certain selected materials are enhanced and that of certain other selected materials is suppressed in the subtracted image. A combination of temporal and energy subtraction is made in a recently deviced technique referred to as "hybrid subtraction."

A typical digital radiography apparatus comprises a somewhat conventional diagnostic fluoroscopy system, but with a digital video acquisition system added. A typical digital radiography system is shown and described in U.S. Pat. Nos. 4,204,225 and 4,204,226, issued to Mistretta and Mistretta et al., respectively, and assigned to the Wisconsin Alumni Research Foundation.

The signal of interest in digital radiography images is generally due to small concentrations of iodinated contrast material within the vasculature. Therefore, the ability to detect subtle amounts of iodine is an important characteristic of a digital radiography system. A parameter used to quantify this capability is called "contrast sensitivity." In order to realistically determine the expected clinical performance of a particular system, the preferred manner to measure contrast sensitivity is with the use of phantoms containing iodine, which are well known in the art. However, all of such phantoms consist of a minimum of three materials: the iodine itself; the material such as, for example, water, into which the iodine is dissolved or suspended; and a mechanical framework such as, for example, a plexiglas containment device. Because there are two or more non-iodinated materials in such phantoms, there are then contrast differences between those two materials which tend to compete with or even exceed the signal resulting from the iodine. Since it is desired that signals in the subtracted images are derived exclusively from the iodine, these prior art phantoms are not satisfactory for the needs of the industry.

It is therefore an object of the invention to provide a radiographic phantom without intrinsic biases such that when it is used in the temporal or energy subtraction process, the resulting images are derived solely from the iodine present in the phantom.

Another object of the present invention is to provide an improved radiographic phantom structure and method of manufacture, whereby there are not two non-iodinated materials whose contrast difference will comprise a part of the image when a temporal or energy-subtraction process is performed.

Yet another object of the present invention is the provision for a radiographic phantom which is particularly well suited to the digital radiographic process.

Still another object of the present invention is the provision for a radiographic phantom which is economical to manufacture and efficient in use.

These objects and other features and advantages become more readily apparent upon reference to the following description when taken in conjunction with the appended drawings.

SUMMARY OF THE INVENTION

Briefly, in accordance with one aspect of the invention, the performance phantom is comprised of only two components, iodine, or an iodinated material, and the material which forms the mechanical structure of the phantom. The iodine, rather than being dissolved in a third component, is dissolved in the same type of material which forms the surrounding mechanical structure. Thus, the only contrast difference in the phantom is that between the iodine and the material of the associated mechanical structure. Accordingly, when two images are made, one being with the iodinated phantom as described, and the other being made with a phantom made entirely of the material forming the mechanical structure (without iodine), then a digital subtraction of the two images results in a signal attributable solely to the iodine.

By another aspect of the invention, the performance phantom of the present invention is constructed by first forming a mechanical framework from a suitable material, such as a plastic, with one or more channels formed therein. The channels are then filled with a mixture comprised of the same type of plastic material with subtle amounts of iodine added. The result is a performance phantom comprised of only two materials, plastic and iodine, such that subtraction imaging will produce images which are derived exclusively from the iodine.

In the drawings as hereinafter described, a preferred embodiment is depicted; however, various other modifications and alternate constructions can be made thereto without departing from the true spirit and scope of the invention.

DESCRIPTION OF THE PREFERRED EMBODIMENT

Figure 1:
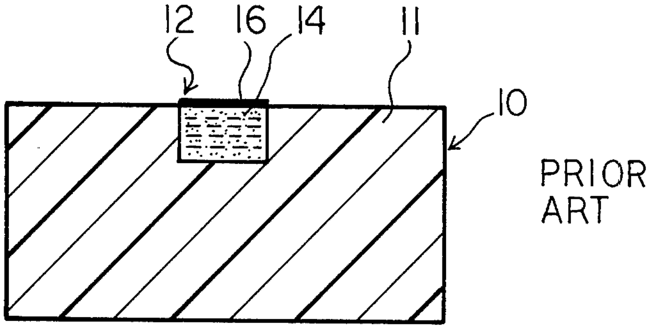
FIG. 1 is a cross-sectional view of a performance phantom in accordance with the prior art.

Referring now to FIG. 1, there is shown a typical performance phantom which has conventionally been used for the purpose of testing a digital radiography system for contrast sensitivity. The phantom, which is indicated generally at 10, comprises a base element 11 having a channel 12 formed therein. Typically, the base element 11 is formed of a block of plastic or other relatively radiolucent material. Disposed in the channel 12 is a contrast solution 14 which is relatively radiopaque. The contrast solution is comprised of water into which there is dissolved small concentrations of iodinated contrast material as shown in FIG. 1. A cover 16 is then required to contain the liquid within the channel 12.

It will be recognized that the conventional iodinated phantom as described above contains intrinsic biases which result in unwanted difference signals when the normal subtraction procedure is implemented. That is to say, when a mask image of a non-iodinated phantom such as a solid piece of base element 11 is subtracted from the image of an iodinated phantom, there are differences in the radiographic properties between not only the iodinated contrast material within the contrast solution 16 and the base element 11, but also between those elements and the water in the contrast solution. Further, the cover 16, if it is comprised of a material different from that of the base element 11, will also contribute to the difference signal. Thus, in addition to the desired signal which results exclusively from the iodine, the resulting difference signal would include undesirable components because of the presence of these other materials. If one uses for one of the unsubtracted images the iodinated phantom of FIG. 1 and for the other unsubtracted image an identical phantom but containing non-iodinated water, the difference signal can, in principle, be solely due to iodine. However, from a practical standpoint, it is extremely difficult to register the two phantoms to the precision required, and misregistration artifacts at the interfaces of the various materials can grossly exceed the iodine signal. Another alternative is to use a single phantom, first with non-iodinated water injected through a tube for acquisition of a mask image. The non-iodinated water is then drained, without moving the phantom, and then iodinated water is injected for the corresponding live image. Such a method is less sensitive to the misregistration artifacts mentioned earlier. However, working with liquids is cumbersome, particularly if one is doing a sequence of different image tests as is routinely done during system calibration.

Similarly, in the process of image subtraction by use of different energy spectra, contrast differences between several non-iodinated materials can interfere with measurements of iodine sensitivity. This phenomena is discussed in more detail in an article entitled "Limitation to iodine isolation using a dual beam non-K-edge approach" by S. J. Riederer, R. A. Kroger, and C. A. Mistretta in the journal, *Medical Physics*, Volume 8, pages 54–61, January–February 1981.

Figure 2:
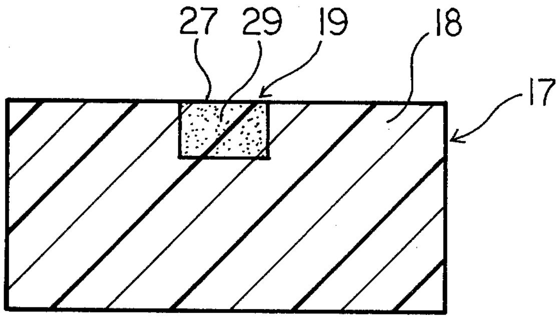
FIG. 2 is a cross-sectional view of a performance phantom in accordance with the present invention.

The improved performance phantom of the present invention is shown in FIG. 2. The phantom 17 comprises a base or substrate 18 made from a relatively radiolucent material similar to that of the prior art. A channel 19 is formed in the base 18 and contains a material which is relatively radiopaque. However, in the installation of the contrast material, care is taken not to introduce a third element, and therefore a third radiographic property, into the structure. Accordingly, the entire structure is comprised of only two materials, one being the material of which the base 18 is composed and the other being the contrast material whose particles are suspended in the same material from which the base 18 is composed.

The structural design and the method of fabrication of the phantom will now be described with reference to FIGS. 2 and 3.

In the fabrication of the base 18, a liquid plastic material 22 is first poured into a mold 23 and allowed to solidify. A preferred material has been found to be Chemco, a casting resin which is commercially available under that name from American Handicrafts Company. It is, of course, understood that other non-iodinated plastics, and even other non-plastic materials, such as metals, could be used to form the base 18.

Figure 3A:
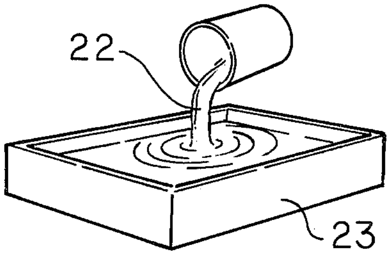
FIGS. 3A–D are perspective views illustrating the progressive steps in the fabrication of a phantom in accordance with the present invention.
Figure 3B:
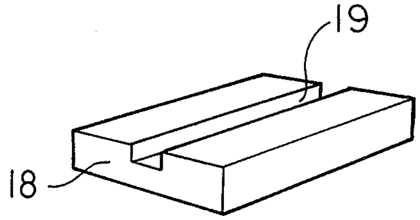

After the base 18 has set and solidified, a channel 19 is formed therein by machining or the like as shown in FIG. 3B. For simplicity of description, the channel 19 is shown as a rectangular-shaped slot which is uniform in size and shape throughout its length. However, it will be recognized and discussed hereinafter that the number, shape, size, and location of the channel, or channels, can be tailored to fit the individual needs of the application. Similarly, it will be understood that various other means besides machining, such as, molding, chemical etching, and the like, can be used for forming the channels 19.

Figure 3C:
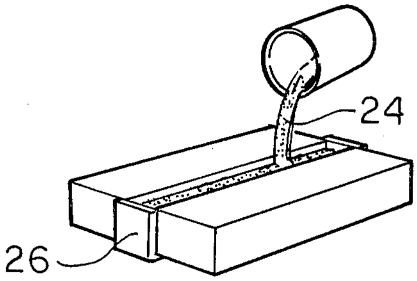
Figure 3D:
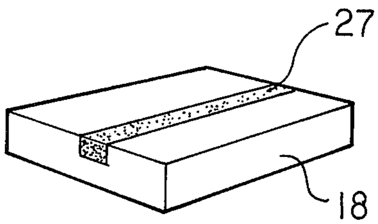

The next step in the fabrication process is to prepare and place into the channel 19 an iodinated liquid plastic solution 24 as shown in FIG. 3C. This is accomplished by first dissolving in the Chemco, or whatever other material the base 18 may be composed of, an iodinated contrast material and then pouring the solution into the channel 19 to set and solidify. A fixture 26 is placed at the ends of the channel as shown to contain the liquid solution until it has solidified. When hardness occurs, the fixture 26 may be removed and the phantom is ready for use as shown in FIG. 3D. It will be understood that the solidified channel portion 27 is comprised of only two materials, the solidified Chemco, which has the same radiographic properties as the remaining portion of the base, and the particles 29 of the iodinated contrast material which are uniformly dispersed within the channel of solidified plastic. For that reason, when a subtraction process is implemented, whether it be temporal or energy subtraction, the resulting subtracted images will be entirely attributable to the presence of the contrast particles 29, as desired.

The material which has formerly been used in the industry as contrast material is an iodinated material, that is, a chemical composition containing iodine in one form or the other. For example, pure iodine, $I_2$, or sodium iodide, NaI, may be used. However, it must be kept in mind that the test for contrast sensitivity necessarily requires the use of minute amounts of iodine, and it therefore must be diluted in another material. With these considerations in mind, small concentrations of pure iodine, $I_2$, may be used if it is effectively and uniformly dispersed in the substrate material. In order to aid in the process of dispersion, it has been found helpful to combine the iodine with other elements, such as, in NaI, in which case the sodium acts more as a carrier rather than as a chemically active ingredient. That is, it does not contribute significantly to the radiopaque properties of the contrast material, but rather, simply enhances the ability of the iodine to be dissolved in the base material. Radiographically, the contrast material can be said to consist essentially of iodine even though there may be substantial amounts of other elements included. In the case of sodium iodide, for example, the contrast material contains 50 Atomic percent of sodium but, for purposes of this description, shall be considered as consisting essentially of iodine since the sodium does not contribute significantly to the radiographic properties of the material.

Contrast materials which have been found to be particularly suited for use with a plastic base such as Chemco are iodo-organic compounds such as monoiodobenzene, $C_6H_5I$, and diiodobenzene, $C_6H_4I_2$. In addition to being readily dissolvable in the liquid plastic, these organic compounds provide an advantage over non-organic compounds, such as NAI, in that they remain in a uniformly dispersed state during the solidification process rather than settling out and separating as NAI has a tendency to do.

Figure 4:
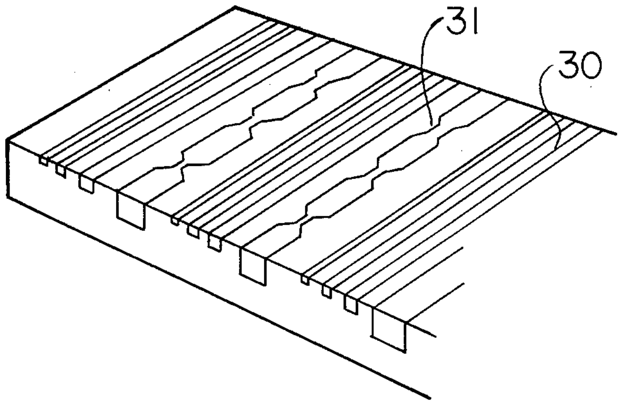
FIG. 4 is a perspective view of a phantom in accordance with the preferred embodiment of the present invention.

Referring now to FIG. 4, there is shown a phantom having a plurality of channels 30 of varying depths and widths. The various sizes are intended to represent a range of various selected blood vessel sizes and/or iodine concentration in a subtraction process. Further, it will be seen that certain of the channels have narrowings or constrictions 31 selectively built in so as to simulate stenoses which regularly occur in blood vessels. The forming of these channels and the process of filling them with iodinated contrast material can be accomplished in the manner and methods as described hereinabove.

It will be understood that, while the present invention has been described in terms of a preferred embodiment, it may take on any number of other forms while remaining within the scope and intent of the invention.

Having thus described the invention, what is claimed as novel and desired to be secured by Letters Patent in the United States is:

1. A phantom for testing the performance of x-ray equipment having image subtraction capabilities comprising a substrate portion composed of a selected material and a channel portion consisting essentially of said selected material having dissolved therein an iodinated material.

2. A phantom as set forth in claim 1 wherein said contrast material comprises a material consisting essentially of iodine.

3. A phantom as set forth in claim 1 wherein said selected material comprises a plastic material.

4. A performance phantom for use in x-ray equipment having image subtraction capabilities comprising a non-iodinated substrate portion and at least one iodinated channel portion, said iodinated channel portion consisting essentially of an iodine material suspended in a material having the same radiographic properties as said substrate portion.

5. A performance phantom as set forth in claim 4 wherein the material in which the iodine is suspended and the material of the substrate portion are of the same type of material.

6. A performance phantom as set forth in claim 5 wherein said material is a plastic material.

7. A performance phantom for use with x-ray equipment having image subtraction capabilities comprising a non-iodinated portion consisting essentially of a non-iodinated material and an iodinated portion, said iodinated portion consisting essentially of said non-iodinated material having suspended therein a material consisting essentially of iodine.

8. A performance phantom as set forth in claim 7 wherein said suspended material comprises an iodo-organic compound.

9. A performance phantom as set forth in claim 7 wherein said suspended material is selected from the group consisting of monoiodobenzene and diiodobenzene.

10. A radiographic phantom for use in testing equipment capabilities in the performance of image-subtraction techniques, consisting essentially of two materials one being of a relatively low contrast material and the other being of a relatively high contrast iodinated material, wherein a first portion of the phantom consists essentially of only said one material and a second portion consists essentially of said other material dissolved in said one material.

11. A radiographic phantom as set forth in claim 10 wherein said relatively low contrast material is plastic and the relatively high contrast material is an iodinated material.

12. A radiographic phantom for use in testing equipment capabilities in the performance of image-subtraction techniques, comprising only two materials, one consisting essentially of iodine and the other consisting essentially of a non-iodinated material, wherein a first portion of the phantom is comprised of a portion of said non-iodinated material and a second portion of said phantom consists essentially of iodine being dissolved in a second portion of said non-iodinated material.

13. A radiographic phantom as set forth in claim 12 wherein said one material comprises an iodo-organic compound.

14. A radiographic phantom as set forth in claim 12 wherein said one material is selected from the group consisting of monoiodobenzene and diiodobenzene.

15. A radiographic phantom for use in testing equipment capabilities in the performance of image-substraction techniques comprising a substrate portion and at least one channel portion, said at least one channel portion being composed of a continuous phase having the same radiographic properties as said substrate portion and a distributed phase consisting essentially of iodine.

16. A radiographic phantom as set forth in claim 15 wherein said substrate portion and said continuous phase part of said channel portion are comprised of plastic.

17. A method of constructing a radiographic phantom comprising the steps of (1) forming a substrate with at least one included channel representative of a blood vessel, and (2) filling said channel with a material comprising a mixture of a first material consisting essentially of iodine and a second material having substantially the same radiographic properties as said substrate.

18. A method as set forth in claim 17 and including an intermediate step of dissolving said first material in a liquid form of said second material.

19. A method as set forth in claim 17 and including a final step of allowing said mixture to solidify.

* * * * *